United States Patent
Struillou et al.

(10) Patent No.: US 11,034,920 B2
(45) Date of Patent: *Jun. 15, 2021

(54) SOLID SCENT BOOSTER COMPOSITION

(71) Applicant: FIRMENICH SA, Satigny (CH)

(72) Inventors: Arnaud Struillou, Geneva (CH); Theodore Anastasiou, Plainsboro, NJ (US); Douglas Minck, Plainsboro, NJ (US); Valery Normand, Plainsboro, NJ (US)

(73) Assignee: Firmenich SA, Satigny (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/496,884

(22) PCT Filed: Mar. 23, 2018

(86) PCT No.: PCT/EP2018/057419
§ 371 (c)(1),
(2) Date: Sep. 23, 2019

(87) PCT Pub. No.: WO2018/172514
PCT Pub. Date: Sep. 27, 2018

(65) Prior Publication Data
US 2020/0087598 A1    Mar. 19, 2020

Related U.S. Application Data

(60) Provisional application No. 62/475,958, filed on Mar. 24, 2017.

(30) Foreign Application Priority Data

Apr. 21, 2017    (EP) ..................... 17167487

(51) Int. Cl.
*C11D 3/50*    (2006.01)
*B01J 13/20*    (2006.01)

(52) U.S. Cl.
CPC ............. *C11D 3/505* (2013.01); *B01J 13/206* (2013.01)

(58) Field of Classification Search
CPC ....... C11D 3/505; C11D 17/0039; C11D 3/50; C11D 17/06; C11D 17/044; C11D 1/72; C11D 3/3707
See application file for complete search history.

(56) References Cited

U.S. PATENT DOCUMENTS

2003/0087788 A1    5/2003    Guerin et al.
2014/0179587 A1*   6/2014    Brown ................ C11D 3/50
                                                510/349
(Continued)

FOREIGN PATENT DOCUMENTS

EP    2300146 B1    3/2017
EP    2579976 B1    8/2017
(Continued)

OTHER PUBLICATIONS

International Search Report and Written Opinion received in International Patent Application No. PCT/EP2018/057419, dated Sep. 27, 2018, 9 pages.

*Primary Examiner* — John R Hardee
(74) *Attorney, Agent, or Firm* — Armstrong Teasdale LLP

(57) ABSTRACT

Described herein is solid scent booster composition including:
  solid carrier,
  granulated powder including particles made of:
  a) a water soluble polymer matrix,
  b) an oil phase including a perfume dispersed in the polymer matrix, the oil being at least partly encapsulated in microcapsules,
  wherein
(Continued)

granulated powder includes up to 30% by weight of encapsulated oil based on the total weight of the powder.

18 Claims, 1 Drawing Sheet

(56) References Cited

U.S. PATENT DOCUMENTS

| | | | | |
|---|---|---|---|---|
| 2016/0024443 A1* | 1/2016 | Aouad | ............... | D06M 13/005 8/137 |
| 2017/0226690 A1* | 8/2017 | Brain | ...................... | B01J 13/06 |
| 2017/0335245 A1* | 11/2017 | Burgess | ................ | C11D 3/222 |
| 2020/0002885 A1* | 1/2020 | Langevin | ............ | C11D 3/3707 |

FOREIGN PATENT DOCUMENTS

| | | |
|---|---|---|
| WO | 2007004166 A1 | 1/2007 |
| WO | 2007137441 A1 | 12/2007 |
| WO | 2013068255 A1 | 5/2013 |
| WO | 2013092375 A1 | 6/2013 |
| WO | 2015110568 A1 | 7/2015 |
| WO | 2016018271 A1 | 2/2016 |
| WO | 2016193435 A1 | 8/2016 |
| WO | 2016144798 A1 | 9/2016 |

* cited by examiner

SOLID SCENT BOOSTER COMPOSITION

CROSS-REFERENCE TO RELATED APPLICATIONS

This application is a U.S. National Phase Application of International Patent Application No. PCT/EP2018/057419, filed Mar. 23, 2018, which claims the benefit of priority to U.S. Provisional Patent Application No. 62/475,958, filed Mar. 24, 2017, and to European Patent Application No. 17167487.2, filed Apr. 21, 2017, the entire contents of which are hereby incorporated by reference herein.

TECHNICAL FIELD

The present invention relates to the field of solid scent boosters. More particularly, the present invention describes a composition comprising a solid carrier and a granulated powder comprising particles having a low perfume loading, i.e granulated powder comprising up to 30% by weight of encapsulated oil.

A laundry composition comprising the solid scent booster is also part of the invention.

BACKGROUND OF THE INVENTION

Fragrances play an important role in the perception of consumer product performance and thus they often determine the consumer's choice for a given product. In addition, the increasing consumer demand for an intense and strong perfume scent delivered on to their laundry is driving the development of scent booster products.

In detergents, hard surface cleaners or personal- or body-care products, the fragrances are incorporated as a free oil and/or encapsulated in microcapsules in order to deliver a pleasant odor to the fabrics, to the surfaces or to the skin.

One main advantage of encapsulated fragrance is that fragrance performance and the long-lasting of the olfactive perception during and after application, (e.g. after rinsing and drying of the skin or the fabrics) is enhanced.

However, when perfume microcapsules are used, other properties must be taken into account to provide a consumer product with a good quality. Indeed, when incorporated into a consumer product base, perfume microcapsules are often in an "aggressive" environment and must therefore exhibit a good stability with low perfume leakage. Furthermore, depending on the type of consumer product, microcapsules can be subjected to high mechanical stresses during the mixing phase with the base and have therefore to exhibit good mechanical properties.

Laundry scent boosters are compositions providing a strong scent to the laundry and which can be used during the washing cycle in addition to common liquid or solid detergents as well as rinse added fabric softeners. A laundry scent booster often comprises solid particles on which is absorbed a free fragrance and act therefore as a fragrance carrier.

WO2016/018271 discloses a solid scent booster having porous particles that are entrained with a fragrance oil. This document teaches that the fragrance oil can be encapsulated. However, when microcapsules are incorporated as a slurry in a solid scent booster composition, this could potentially lead to a high capsule breakage during the processing as well a poor stability upon time.

It is also known from the prior art that microcapsules with optionally free perfume can be dried resulting in a matrix structure.

However, dried microcapsules of the prior art are not suitable to be incorporated in all consumer products, and especially into solid scent booster.

There is therefore a need for a solid scent booster comprising a granulated powder having not only good performance in terms of stability and olfactive performance but that can also survive a manufacturing process requiring high shearing.

The solid scent booster composition of the invention solves this problem as it comprises granulated powder containing particles made of a polymeric matrix and encapsulated oil according to optimized relative proportions that prevents not only particle abrasion during the manufacturing process but also that prevents particle degradation during shelf life when they are in prolonged contact with the solid carrier.

SUMMARY OF THE INVENTION

A first object of the invention is a solid scent booster composition comprising:
 solid carrier,
 granulated powder comprising particles made of:
 a) a water soluble polymer matrix,
 b) an oil phase comprising a perfume dispersed in said polymer matrix, said oil being at least partly encapsulated in microcapsules,
 wherein
   granulated powder comprises up to 30% by weight of encapsulated oil based on the total weight of the powder.

A second object of the invention is a laundry composition comprising the scent booster composition as defined above and a laundry additive selected from the group consisting of a detergent, a softener, a rinse-aid, a water-softening or a bleach-booster composition.

A third object is the use of the solid scent booster composition as defined above during the laundry washing to deliver fragrance to the fabrics.

DETAILED DESCRIPTION OF THE INVENTION

Figure 1:
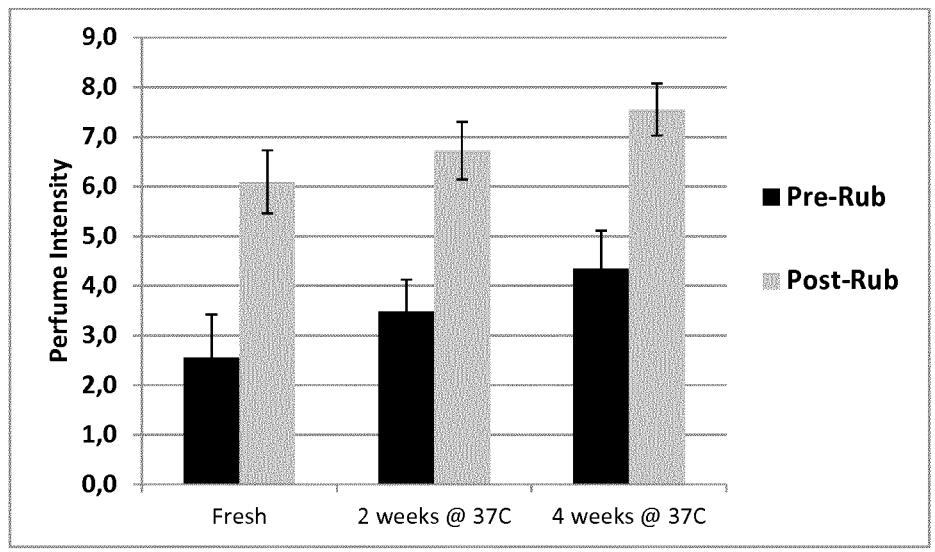
FIGS. 1 and 2 represent the intensity rating of a scent booster composition comprising the granulated powder defined in the invention (fresh, after 2 weeks at 37° C. and after 4 weeks at 37° C.).

Unless stated otherwise, percentages (%) are meant to designate percent by weight of a composition.

When referring to "particles" or "granulated powder", percentages (%) are given for the dried composition.

The present invention has now determined a way to improve not only the chemical resistance of the granulated powder when incorporated in a solid scent booster composition but also the mechanical resistance of the granulated powder when subjected to high shearing conditions during the manufacturing process.

Indeed, a first object of the invention is a solid scent booster composition comprising:
 a solid carrier, granulated powder comprising particles made of:
a) a water soluble polymer matrix,
b) an oil phase comprising a perfume dispersed in said polymer matrix, said oil being at least partly encapsulated in microcapsules,
wherein
granulated powder comprises up to 30% by weight of encapsulated oil based on the total weight of the powder.

Solid Carrier

According to the invention, solid carrier can be any particles, preferably porous particles suitable to vehicle the fragrance on fabrics.

Solid carrier may be any water soluble acid, organic or inorganic, and salts and conjugate bases thereof, including alkali metals, alkaline earth metals, and transition metals and complexes thereof.

According to an embodiment, solid carrier is chosen in the group consisting of urea, sodium chloride, sodium sulphate, sodium acetate, zeolite, sodium carbonate, sodium bicarbonate, clay, talc, calcium carbonate, magnesium sulfate, gypsum, calcium sulfate, magnesium oxide, zinc oxide, titanium dioxide, calcium chloride, potassium chloride, magnesium chloride, zinc chloride, saccharides such as sucrose, mono-, di-, and polysaccharides and derivatives such as starch, cellulose, methyl cellulose, ethyl cellulose, propyl cellulose, polyols/sugar alcohols such as sorbitol, maltitol, xylitol, erythritol, and isomalt, PEG, PVP, citric acid or any water soluble solid acid, fatty alcohols or fatty acids and mixtures thereof.

According to a particular embodiment, the solid carrier is sodium chloride and/or urea.

According to a particular embodiment, the solid carrier is sodium chloride.

According to a particular embodiment, the solid carrier is a mixture of clay and PEG, preferably the mixture comprises 0-30% clay and 20-80% PEG, preferably between 1-30% clay and 20-80% PEG, based to the total weight of the carrier.

According to a particular embodiment, the solid carrier is a mixture of sodium acetate and PEG, preferably the mixture comprises 0-80% sodium acetate and 0-50% PEG, preferably 1-80% sodium acetate and 1-50% PEG.

PEG has preferably a molecular weight greater than 1000 g/mol, preferably between 1000 and 8000 g/mol.

According to an embodiment, the solid carrier is particles having preferably a mean size comprised between 10 and 2000 microns, preferably between 40 and 1000 microns, more preferably between 50 and 600 microns.

According to an embodiment, the composition of the invention comprises from 10 to 99.5% by weight, preferably 50 to 99.5% by weight, more preferably from 75 to 99.5% by weight of the solid carrier based on the total weight of the composition.

According to an embodiment, solid carrier comprises a perfume adsorbed onto or absorbed into said carrier.

When present, free perfume can be added in an amount comprised between 0.1 and 8%, preferably between 0.1 and 4 by weight based on the total weight of the composition.

Granulated Powder Comprising Particles

According to the invention, the granulated powder comprises particles made of:
a water soluble polymer matrix,
an oil phase comprising a perfume dispersed in said polymer matrix, said oil being at least partly encapsulated in microcapsules.

Water Soluble Polymer Matrix

Any water soluble polymer can be used for the purpose of the invention. Preferably, the water soluble polymer has emulsifying properties.

A "water soluble polymer" is intended for the purpose of the present invention as encompassing any polymer which forms a one-phase solution in water. Preferably, it forms a one phase solution when dissolved in water at concentrations as high as 20% by weight, more preferably even as high as 50% by weight. Most preferably it forms a one phase solution when dissolved in water at any concentration.

Examples of water soluble polymer as defined in the present invention are starch, modified starch, maltodextrins, polysccharides, carbohydrates, chitosan, gum arabic, polyethylene glycol, polyvinyl pyrrolidone, polyvinyl alcohol, acrylamides, acrylates, polyacrylic acid and related, maleic anhydride copolymers, amine-functional polymers, vinyl ethers, styrenes, polystyrenesulfonates, vinyl acids, ethylene glycol-propylene glycol block copolymers, and mixtures thereof.

According to a particular embodiment, the water soluble polymer comprises Maltodextrin having a Dextrose Equivalent (DE) comprised between 3 and 20, preferably between 10 and 18.

According to an embodiment, the water soluble polymer comprises Maltodextrin 18DE and/or Maltodextrin 10DE.

According to a particular embodiment, the water soluble polymer comprises Maltodextrin 10DE.

According to an embodiment, granulated powder comprises at least 55% by weight of water soluble polymer based on the total weight of the powder.

According to a particular embodiment, granulated powder comprises between 55 and 95%, preferably between 60 and 85%, more preferably comprises between 70 and 80% by weight of water soluble polymer based on the total weight of the powder.

According to an embodiment, the weight ratio between the water soluble polymer and encapsulated oil within the granulated powder is comprised between 2 and 20, preferably between 3.5 and 10.

Oil Phase Comprising a Perfume

According to the invention, the oil phase comprises a perfume.

According to a particular embodiment, the oil phase comprises a mixture of a perfume with another ingredient selected from the group consisting of nutraceuticals, cosmetics, insect control agents and biocide actives.

According to a particular embodiment, the hydrophobic active ingredient consists of a perfume.

By "perfume oil" (or also "perfume") what is meant here is an ingredient or composition that is a liquid at about 20° C. According to any one of the above embodiments said perfume oil can be a perfuming ingredient alone or a mixture of ingredients in the form of a perfuming composition. As a "perfuming ingredient" it is meant here a compound, which is used for the primary purpose of conferring or modulating an odour. In other words such an ingredient, to be considered as being a perfuming one, must be recognized by a person skilled in the art as being able to at least impart or modify in a positive or pleasant way the odor of a composition, and not just as having an odor. For the purpose of the present invention, the perfume oil also includes the combination of perfuming ingredients with substances which together improve, enhance or modify the delivery of the perfuming ingredients, such as perfume precursors, emulsions or dispersions, as well as combinations which impart an additional benefit beyond that of modifying or imparting an odor, such as long-lasting, blooming, malodour counteraction, antimicrobial effect, microbial stability or insect control.

The nature and type of the perfuming ingredients present in the oil phase do not warrant a more detailed description here, which in any case would not be exhaustive, the skilled person being able to select them on the basis of its general knowledge and according to intended use or application and the desired organoleptic effect. In general terms, these perfuming ingredients belong to chemical classes as varied as alcohols, aldehydes, ketones, esters, ethers, acetates, nitriles, terpenoids, nitrogenous or sulphurous heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of perfumery. It is also understood that said ingredients may also be compounds known to release in a controlled manner various types of perfuming compounds.

The perfuming ingredients may be dissolved in a solvent of current use in the perfume industry. The solvent is preferably not an alcohol. Examples of such solvents are diethyl phthalate, isopropyl myristate, Abalyn® (rosin resins, available from Eastman), benzyl benzoate, ethyl citrate, limonene or other terpenes, or isoparaffins. Preferably, the solvent is very hydrophobic and highly sterically hindered, like for example Abalyn® or benzyl benzoate.

Encapsulated Oil in Microcapsules within the Water Soluble Polymer Matrix

According to the invention, the oil phase is dispersed within the water soluble polymer matrix and has at least one part that is encapsulated in at least one microcapsule.

According to the invention, "encapsulated oil" refers to oil that is encapsulated in a microcapsule.

By contrast, according to the invention, "non-encapsulated oil" refers to oil that is simply entrapped (or dispersed) within the polymer matrix but that is not encapsulated in a microcapsule.

The nature of the polymeric shell of the microcapsules of the invention can vary. As non-limiting examples, the shell can be made of a material selected from the group consisting of polyurea, polyurethane, polyamide, polyacrylate, polysiloxane, polycarbonate, polysulfonamide, urea formaldehyde, melamine formaldehyde resin, melamine formaldehyde resin cross-linked with polyisocyanate or aromatic polyols, melamine urea resin, melamine glyoxal resin, gelatin/gum arabic shell wall, and mixtures thereof.

According to an embodiment, the shell of the microcapsule is based on melamine formaldehyde resin or melamine formaldehyde resin cross-linked with at least one polyisocyanate or aromatic polyols.

The shell can also be a hybrid, namely organic-inorganic such as a hybrid shell composed of at least two types of inorganic particles that are cross-linked, or yet a shell resulting from the hydrolysis and condensation reaction of a polyalkoxysilane macro-monomeric composition.

According to an embodiment, the shell comprises an aminoplast copolymer, such as melamine-formaldehyde or urea-formaldehyde or cross-linked melamine formaldehyde or melamine glyoxal.

According to a particular embodiment, the core-shell microcapsules are cross-linked melamine formaldehyde microcapsules obtainable by a process comprising the steps of:

1) admixing a perfume oil with at least a polyisocyanate having at least two isocyanate functional groups to form an oil phase;
2) dispersing or dissolving into water an aminoplast resin and optionally a stabilizer to form a water phase;
3) adding the oil phase to the water phase to form an oil-in-water dispersion, wherein the mean droplet size is comprised between 1 and 100 microns, by admixing the oil phase and the water phase;
4) performing a curing step to form the wall of said microcapsule; and
5) optionally drying the final dispersion to obtain a dried core-shell microcapsule;

This process is described in more details in WO 2013/092375 and WO 2015/110568, the contents of which are included by reference.

According to another embodiment the shell is polyurea-based made from, for example but not limited to isocyanate-based monomers and amine-containing crosslinkers such as guanidine carbonate and/or guanazole. Preferred polyurea-based microcapsules comprise a polyurea wall which is the reaction product of the polymerisation between at least one polyisocyanate comprising at least two isocyanate functional groups and at least one reactant selected from the group consisting of an amine (for example a water soluble guanidine salt and guanidine); a colloidal stabilizer or emulsifier; and an encapsulated perfume. However, the use of an amine can be omitted.

According to another embodiment, the shell is polyurethane-based made from, for example but not limited to polyisocyanate and polyols, polyamide, polyester, etc.

According to a particular embodiment the colloidal stabilizer includes an aqueous solution of between 0.1% and 0.4% of polyvinyl alcohol, between 0.6% and 1% of a cationic copolymer of vinylpyrrolidone and of a quaternized vinylimidazole (all percentages being defined by weight relative to the total weight of the colloidal stabilizer).

According to another embodiment, the emulsifier is an anionic or amphiphilic biopolymer preferably chosen from the group consisting of polyacrylate (and copolymers especially with acrylamide), gum arabic, soy protein, gelatin, sodium caseinate and mixtures thereof.

According to a particular embodiment, the polyisocyanate is an aromatic polyisocyanate, preferably comprising a phenyl, a toluyl, a xylyl, a naphthyl or a diphenyl moiety. Preferred aromatic polyisocyanates are biurets and polyisocyanurates, more preferably a polyisocyanurate of toluene diisocyanate (commercially available from Bayer under the tradename Desmodur® RC), a trimethylol propane-adduct of toluene diisocyanate (commercially available from Bayer under the tradename Desmodur® L75), a trimethylol propane-adduct of xylylene diisocyanate (commercially available from Mitsui Chemicals under the tradename Takenate® D-110N).

According to a particular embodiment, the polyisocyanate is a trimethylol propane-adduct of xylylene diisocyanate (commercially available from Mitsui Chemicals under the tradename Takenate® D-110N).

The preparation of an aqueous dispersion/slurry of core-shell microcapsules is well known from a skilled person in the art. In one aspect, said microcapsule wall material may comprise any suitable resin and especially including melamine, glyoxal, polyurea, polyurethane, polyamide, polyester, etc. Suitable resins include the reaction product of an aldehyde and an amine, suitable aldehydes include, formaldehyde and glyoxal. Suitable amines include melamine, urea, benzoguanamine, glycoluril, and mixtures thereof.

Suitable melamines include, methylol melamine, methylated methylol melamine, imino melamine and mixtures thereof. Suitable ureas include, dimethylol urea, methylated dimethylol urea, urea-resorcinol, and mixtures thereof. Suitable materials for making may be obtained from one or more of the following companies Solutia Inc. (St Louis, Mo. U.S.A.), Cytec Industries (West Paterson, N.J. U.S.A.), Sigma-Aldrich (St. Louis, Mo. U.S.A.).

According to a particular embodiment, the core-shell microcapsule is a formaldehyde-free capsule. A typical process for the preparation of aminoplast formaldehyde-free microcapsules slurry comprises the steps of:
1) preparing an oligomeric composition comprising the reaction product of, or obtainable by reacting together
   a) a polyamine component in the form of melamine or of a mixture of melamine and at least one $C_1$-$C_4$ compound comprising two $NH_2$ functional groups;
   b) an aldehyde component in the form of a mixture of glyoxal, a $C_{4-6}$ 2,2-dialkoxy-ethanal and optionally a glyoxalate, said mixture having a molar ratio glyoxal/$C_{4-6}$ 2,2-dialkoxy-ethanal comprised between 1/1 and 10/1; and
   c) a protic acid catalyst;
2) preparing an oil-in-water dispersion, wherein the droplet size is comprised between 1 and 600 um, and comprising:
   i. an oil;
   ii. a water medium
   iii. at least an oligomeric composition as obtained in step 1;
   iv. at least a cross-linker selected amongst
      A) $C_4$-$C_{12}$ aromatic or aliphatic di- or tri-isocyanates and their biurets, triurets, trimmers, trimethylol propane-adduct and mixtures thereof; and/or
      B) a di- or tri-oxiran compounds of formula A-(oxiran-2-ylmethyl)$_n$
         wherein n stands for 2 or 3 and 1 represents a $C_2$-$C_6$ group optionally comprising from 2 to 6 nitrogen and/or oxygen atoms;
   v. optionally a $C_1$-$C_4$ compounds comprising two $NH_2$ functional groups;
3) heating said dispersion;
4) cooling said dispersion.

This process is described in more details in WO 2013/068255, the content of which is included by reference.

According to another embodiment, the shell of the microcapsule is polyurea- or polyurethane-based. Examples of processes for the preparation of polyurea- and polyureathane-based microcapsule slurry are for instance described in WO2007/004166, EP 2300146, EP2579976 the contents of which is also included by reference. Typically a process for the preparation of polyurea- or polyurethane-based microcapsule slurry include the following steps:
   a) dissolving at least one polyisocyanate having at least two isocyanate groups in an oil to form an oil phase;
   b) preparing an aqueous solution of an emulsifier or colloidal stabilizer to form a water phase;
   c) adding the oil phase to the water phase to form an oil-in-water dispersion, wherein the mean droplet size is comprised between 1 and 500 μm, preferably between 5 and 50 μm;
   d) applying conditions sufficient to induce interfacial polymerisation and form microcapsules in form of a slurry.

According to the invention, it should be understood that, after encapsulation, whatever the nature of the microcapsule(s), the internal core of the capsule is only made of the core oil composed of a perfume oil.

The particles defined in the present invention can contain microcapsules which can vary by the core perfume oil inside them and/or by the wall (different chemistries or same chemistries but different process parameters like cross-linking temperature or duration).

According to a particular embodiment of the invention, the microcapsules have an outer coating selected from the group consisting of a non-ionic polysaccharide, a cationic polymer and mixtures thereof.

Such coating will help drive capsule deposition and retention on substrate during the wash process so that a significant part of the capsules which have not been broken in the wash phase/upon lathering would transfer to the substrate (skin, hair fabrics) and be available for perfume release when the capsules are broken upon rubbing after drying.

Non-ionic polysaccharide polymers are well known to a person skilled in the art. Preferred non-ionic polysaccharides are selected from the group consisting of locust bean gum, xyloglucan, guar gum, hydroxypropyl guar, hydroxypropyl cellulose and hydroxypropyl methyl cellulose.

Cationic polymers are also well known to a person skilled in the art. Preferred cationic polymers have cationic charge densities of at least 0.5 meq/g, more preferably at least about 1.5 meq/g, but also preferably less than about 7 meq/g, more preferably less than about 6.2 meq/g. The cationic charge density of the cationic polymers may be determined by the Kjeldahl method as described in the US Pharmacopoeia under chemical tests for Nitrogen determination. The preferred cationic polymers are chosen from those that contain units comprising primary, secondary, tertiary and/or quaternary amine groups that can either form part of the main polymer chain or can be borne by a side substituent directly connected thereto. The weight average (Mw) molecular weight of the cationic polymer is preferably between 10,000 and 2M Dalton, more preferably between 50,000 and 3.5M Dalton.

According to a particular embodiment, one will use cationic polymers based on acrylamide, methacrylamide, N-vinylpyrrolidone, quaternized N,N-dimethylaminomethacrylate, diallyldimethylammonium chloride, quaternized vinylimidazole (3-methyl-1-vinyl-1H-imidazol-3-ium chloride), vinylpyrrolidone, acrylamidopropyltrimonium chloride, cassia hydroxypropyltrimonium chloride, guar hydroxypropyltrimonium chloride or polygalactomannan 2-hydroxypropyltrimethylammonium chloride ether, starch hydroxypropyltrimonium chloride and cellulose hydroxypropyltrimonium chloride. Preferably copolymers shall be selected from the group consisting of polyquaternium-5, polyquaternium-6, polyquaternium-7, polyquaternium10, polyquaternium-11, polyquaternium-16, polyquaternium-22, polyquaternium-28, polyquaternium-43, polyquaternium-44, polyquaternium-46, cassia hydroxypropyltrimonium chloride, guar hydroxypropyltrimonium chloride or polygalactomannan 2-hydroxypropyltrimethylammonium chloride ether, starch hydroxypropyltrimonium chloride and cellulose hydroxypropyltrimonium chloride As specific examples of commercially available products, one may cite Salcare® SC60 (cationic copolymer of acrylamidopropyltrimonium chloride and acrylamide, origin: BASF) or Luviquat®, such as the PQ 11N, FC 550 or Style (polyquaternium-11 to 68 or quaternized copolymers of vinylpyrrolidone origin: BASF), or also the Jaguar® (C13S or C17, origin Rhodia).

Granulated powder defined in the present invention comprises up to 30%, preferably up to 25%, more preferably up to 20% by weight of encapsulated oil based on the total weight of the powder leading robust particles having a large amount of water soluble polymer matrix.

According to the invention, granulated powder comprises between 3 and 30%, preferably between 5 and 25%, more preferably between 5 and 20% by weight of encapsulated oil based on the total weight of the powder.

It was found that such granulated powder with a relatively low loading up to 30%, preferably up to 25%, more preferably up to 20% by weight of encapsulated oil based on the total weight of the powder are best suited to survive an industrial manufacturing process requiring high shearing as this helps reduce granule and microcapsule breakage upon processing. It was found that such granulated powder with a relatively low loading up of encapsulated oil survive better upon aging of the scent booster composition, i.e. less encapsulated perfume oil leaks out of the microcapsule and granule upon storage.

Furthermore, it was found that the decrease of the fragrance loading does not alter the performance of the particles when incorporated in a solid scent booster.

As a result, particles can be used in a cost-effective way as only a low dosage of such particles is needed thanks to limited breakage upon industrial processing and better stability upon aging of the scent booster composition.

Thus, the present invention provides a solid scent booster that is efficient and that can survive a manufacturing process requiring high-shearing.

According to a particular embodiment, the totality of the oil phase comprised in the granulated powder is encapsulated.

Optionally Non-Encapsulated Oil within the Water Soluble Polymer Matrix

According to an embodiment, the oil phase comprises at least one part that is not encapsulated.

By "non-encapsulated oil", it should be understood that the oil phase is not encapsulated in a microcapsule but is simply entrapped within the water soluble polymer matrix.

According to this embodiment, granulated powder comprises up to 45%, preferably up to 35% by weight of the total amount of the oil phase based on the total weight of the powder.

According to an embodiment, granulated powder comprises between 3 and 45%, preferably between 5 and 35% by weight of the oil phase based on the total weight of the powder.

According to an embodiment, granulated powder comprises between 0.1 and 40%, preferably between 10 and 30% by weight of non-encapsulated oil based on the total weight of the powder.

Optional Ingredients in the Scent Booster Composition

The laundry scent booster composition of the invention may comprise one or more optional ingredients.

Optional ingredients include those well-known in the art for use in solid scent booster composition such as dyes, anticaking agents, filler, humectant, corrosion inhibitors, silicone, anti-redeposition polymers, colour-care polymers, optical brighteners. As non-limiting examples, one may cite sodium silicate, fumed silica, dipropylene glycol, propylene glycol, glycerine or mixtures thereof.

According to an embodiment, the composition may comprises from about 0.001% to about 0.5%, preferably from about 0.01% to about 0.01%, of dye(s) by weight of the composition.

Dye(s) used for the granulated powder and for the solid particles can be the same or different.

According to an embodiment, the scent booster composition comprises a binder to hold the granulated powder and the solid carrier together during the manufacturing process.

As non-limiting examples of binder, one may cite liquid polyethylene, polypropylene glycol, liquid nonionic surfactants, liquid silicone oil and mixtures thereof.

When present, the scent booster composition comprises from 0.01 to 10%, preferably from 0.1 to 5% of binder by weight of the composition.

According to an embodiment, the solid scent booster is free of malodor-absorbing compounds such as cyclodextrins.

According to a particular embodiment, the composition comprises:
from 10 to 99.5%, preferably from 50 to 97% by weight of solid carrier, and
from 0.1 to 50%, preferably from 3 to 30%, more preferably from 3% and 15% by weight of granulated powder based on the total weight of the composition.

According to an embodiment, the composition described above further comprises:
from 0 to 95% by weight of sodium bicarbonate, and/or
from 0 to 5%, preferably from 0 to 3% by weight of sodium silicate, and/or
from 0 to 5%, preferably from 0 to 3% by weight of silica, and/or
from 0 to 8% by weight of free perfume.

Process for Preparing the Granulated Powder

There are several alternatives to the method for the preparation of the granulated powder as defined in the invention.

Indeed, there is no limitation regarding the way to obtain the dried particles provided that a low fragrance loading can be obtained.

Among those methods, one may cite for example the spray-drying that is well-known method for the encapsulation of fragrances.

Thus, according to an embodiment, the composition comprises spray-dried particles.

Therefore, according to an embodiment, the composition contains granulated powder comprising spray-dried particles obtained by a process comprising the following steps:
(i) Preparing a water phase comprising a water soluble polymer,
(ii) Optionally, preparing an oil phase comprising a perfume; and mixing the oil phase with the water phase to obtain an emulsion;
(iii) Mixing the water phase of step (i) or the emulsion of step (ii) with a microcapsule slurry comprising at least a microcapsule having an oil-based core comprising a perfume and a polymeric shell; and
(iv) Spray-drying the slurry of step (iii) to obtain a spray-dried particle, characterized in that the granulated powder comprises up to 30% by weight of encapsulated oil based on the total weight of the powder.

An anticaking agent like silica can be added during step (iii) and/or step (iv) and/or after step (iv) of the process described above.

However, one may cite also other drying method such as the extrusion, the fluidized bed, or even a drying at room temperature using materials (carrier, desiccant) that meet specific criteria.

Another object of the invention is a process for manufacturing the solid scent booster composition defined above, said process comprising the step consisting of:

mixing solid carrier with granulated powder as defined above, wherein the solid carrier is optionally previously mixed with a free perfume, and drying said mixture.

As the scent booster composition of the invention provides strong scent to the laundry, it can be used with other laundry additives such as detergents or softeners.

Thus, another object of the invention is a laundry composition comprising the scent booster composition as defined above and a laundry additive selected from the group consisting of a detergent, a softener, a rinse-aid, a water-softening or a bleach-booster composition.

Another object of the present invention is the use of the scent booster composition during the laundering to provide fragrance to fabrics.

The invention will now be further described by way of examples. It will be appreciated that the invention as claimed is not intended to be limited in any way by these examples.

EXAMPLES

Example 1

Preparation of Granulated Powder Used in Compositions of the Present Invention

1. Synthesis of the Melamine-Formaldehyde Microcapsules Containing a Perfume Oil (Microcapsules 1)

TABLE 1

Composition of slurry of core-shell microcapsules 1

| Ingredient | [%] |
|---|---|
| Oil Phase | 30.9 |
| Perfume oil[a] | 30.28 |
| trimethylol propane adduct of xylylene diisocyanate[1] | 0.62 |
| Water phase | 69.1 |
| Acrylamide and acrylic acid copolymer[2] | 4.7 |
| Melamine-formaldehyde resins[3] | 2.45[3] |
| Water | 50.55 |
| Sodium hydroxide | 0.5 |
| Acetic acid | 0.2 |
| acrylamidopropyltrimonium chloride/acrylamide copolymer[4] | 10.7 |
| Total | 100 |
| Ratio of pure melamine/formaldehyde resins to perfume oil[5] | 0.057 |

[a]See table 1a) (perfume A)/see table 1b) (perfume B)
[1]Takenate ® D110N (75% active solution in ethyl acetate)
[2]Alcapsol from Ciba, 20% solution in water
[3]90/10 blend of Cymel 385 & Cymel 9370 from Cytec, both 70% solution in water
[4]Salcare SC60 from Ciba, 3% solution in water
[5]= pure melamine/formaldehyde resin (70% of quantity used in[2])/quantity of perfume oil TABLE 1a Composition of perfume A

| Ingredients | % |
|---|---|
| ISOBORNYL ACETATE | 13.5 |
| EUCALYPTUS GLOBULUS OIL | 13.5 |

TABLE 1a-continued

Composition of perfume A

| Ingredients | % |
|---|---|
| VERDYL PROPIONATE | 13.5 |
| BETA-IONONE | 13.5 |
| GAMMA UNDECALACTONE | 13.5 |
| TERPINYL ACETATE | 13.5 |
| CITRONELLYL NITRILE | 6.7 |
| LINALYL ACETATE | 12.2 |

TABLE 1b

Composition of perfume B

| Ingredients | % |
|---|---|
| Gamma-Undecalactone | 12.5 |
| Verdyl propionate | 9.6 |
| Eucalyptus globulus oil | 12.5 |
| Benzyl salicylate | 10.6 |
| Hexyl salicylate | 19.3 |
| Verdox ™[1] | 9.6 |
| Beta-Ionone | 12.5 |
| Iso-Bornyl Acetate | 4.8 |
| Citronitrile | 4.8 |
| 2,4-Dimethyl-3-cyclohexene-1-carbaldehyde | 3.8 |

[1]2-tert-butyl-1-cyclohexyl acetate, International Flavors & Fragrances, USA

The oil phase was prepared by admixing a polyisocyanate (trimethylol propane adduct of xylylene diisocyanate, Takenate® D-110N, origin: Mitsui Chemicals) with a core oil composed of a perfume oil (see table 1a) or 1b) above). The oil phase consisted of 2% Takenate® D-110N and 98% of core oil. After encapsulation and use of the Takenate D-110N to cross-link the melamine-formaldehyde wall, the residual level of unreacted polyisocyanate in the core oil was very low and therefore the internal core of the capsule was only made of the core oil composed of a perfume oil.

To make the capsules slurry, the acrylamide and acrylic acid copolymer and the blend of the two melamine-formaldehyde resins were dissolved in water to form the water phase. Then the perfume premix oil was added into this solution and the pH was regulated to 5 with acetic acid. The temperature was raised to 90° C. for 2 hours to allow the curing of the capsules. At this point, capsules were formed, cross-linked and stable. A 3% Salcare SC60 (acrylamidopropyltrimonium chloride/acrylamide copolymer) solution in water was then added into the mixture at 80° C. and was allowed to react for 2 hours at 80° C. Then a solution of ethylene urea (50% wt in water) was added as usually done with aminoplast capsules as an agent to scavenge residual free formaldehyde. Final slurry contains about 3% w/w of ethylene urea relative to the weight of the slurry and the mixture was left to cool down to room temperature. The final pH was adjusted to 7 with sodium hydroxide.

2. Preparation of Granulated Powder Used in the Composition According to the Present Invention 2.1. Granulated Powder A-E: Granulated Powder Obtained by Spray-Drying Emulsions A-E having the following ingredients were prepared:

TABLE 2

Composition of Emulsions A-E and composition of granulated powder A-E after spray-drying

| Ingredients | Emulsion A | Emulsion B | Emulsion C | Comparative emulsion D | Emulsion E |
|---|---|---|---|---|---|
| Modified starch[1] | 2.6% | 2.6% | 2.6% | 2.6% | 12.5% |
| Maltodextrin[2] | 26.8% | 22.8% | 19.3% | 12.8% | 0% |
| Maltose[3] | 0% | 0% | 0% | 0% | 7.9% |
| Citric Acid | 0% | 0% | 0% | 0% | 1% |
| Tripotassium Citrate | 0% | 0% | 0% | 0% | 1.9% |
| Microcapsules slurry obtained in example 1.1 | 12.0% | 24% | 37.0% | 55.0% | 8.9% |
| Silica[4] | 1.1% | 1.1% | 1.1% | 1.1% | 0% |
| Free Perfume C[5] | 0% | 0% | 0% | 0% | 11% |
| Water | 57.6% | 49.6% | 40.1% | 28.6% | 56.9% |

| | Granule A | Granule B | Granule C | Comparative granule D | Granule E |
|---|---|---|---|---|---|
| Modified starch[1] | 7.5% | 7.4% | 7.2% | 7.2% | 31.6% |
| Maltodextrin[2] | 77.4% | 65.5% | 53.8% | 35.9% | 0% |
| Maltose | 0% | 0% | 0% | 0% | 20.9% |
| Citric Acid | 0% | 0% | 0% | 0% | 2.6% |
| Tripotassium citrate | 0% | 0% | 0% | 0% | 4.9% |
| Perfume C dispersed in matrix | 0% | 0% | 0% | 0% | 28.1% |
| Microcapsules from slurry obtained in 1.1 | 12.% | 24.1% | 36.1% | 53.9% | 9.8% |
| Silica | 3.0 | 3.0% | 2.9% | 2.9% | 2.0% |
| Fragrance loading in powder after spray-drying | 10.1% | 20.1% | 30% | 44.9% | 35.8% |

[1]CapsulTM, Ingredion
[2]Maltodextrin 10DE origin: Roquette
[3]Maltose, Lehmann & Voss
[4]Silica, Evonik
[5]see table 3

TABLE 3

Composition of Perfume C

| Component | % |
|---|---|
| ACETATE DE 4-(1,1-DIMETHYLETHYL)-1-CYCLOHEXYLE[1] | 14.50 |
| LINALOL BJ | 10.50 |
| LILIAL ®[2] | 10.00 |
| ISO E SUPER[3] | 10.00 |
| CITRONELLYL NITRILE | 9.00 |
| DIPHENYLOXYDE | 6.50 |
| ISOBORNYL ACETATE | 6.00 |
| BETA IONONE | 6.00 |
| TRICYCLO[5.2.1.0~2,6~]DEC-3-EN-8-YL ACETATE (A) + TRICYCLO[5.2.1.0~2,6~]DEC-4-EN-8-YL ACETATE (B)[4] | 5.50 |
| ETHER MT | 4.00 |
| HEDIONE ®[5] | 4.00 |
| GERANIOL 60 | 3.00 |
| CITRAL | 2.50 |
| ALDEHYDE C 10 | 2.50 |
| ALLYL HEPTANOATE | 2.50 |
| ETHYL METHYL-2-BUTYRATE | 1.50 |
| GERANYL ACETATE | 1.00 |

TABLE 3-continued

Composition of Perfume C

| Component | % |
|---|---|
| 2,4-DIMETHYL-3-CYCLOHEXENE-1-CARBALDEHYDE[6] | 1.00 |

[1]Firmenich SA, Switzerland
[2]3-(4-tert-butylphenyl)-2-methylpropanal, Givaudan SA, Vernier, Switzerland
[3]1-(octahydro-2,3,8,8-tetramethyl-2-naphtalenyl)-1-ethanone, International Flavors & Fragrances, USA
[4]Firmenich SA, Switzerland
[5]Methyl dihydrojasmonate, Firmenich SA, Switzerland
[6]Firmenich SA, Switzerland Components for the polymeric matrix (Maltodextrin and Capsul™, or Capsul™, citric acid and tripotassium citrate) were added in water at 45-50° C. until complete dissolution. For emulsion E, free perfume C was added to the aqueous phase.

Microcapsules slurry was added to the obtained mixture. Then, the resulting mixture was then mixed gently at 25° C. (room temperature).

Granulated powder A-E were prepared by spray-drying Emulsion A-E using a Sodeva Spray Dryer (Origin France), with an air inlet temperature set to 215° C. and a throughput set to 500 ml per hour. The air outlet temperature was of 105° C. The emulsion before atomization was at ambient temperature.

The fragrance oil content in the spray-dried granulated powder was measured by LF-NMR using the proper calibration.

2.2. Granulated powder F: Dried particles obtained by drying at RT

Particles F were obtained as described below:

31 g sucrose (non-emulsifying carrier) was dissolved in 100 g of microcapsule slurry obtained according to example 1.1.

Then, 75 g of the obtained suspension were dried onto 423 g maltodextrin 2DE in a cutter blender by shearing for 30 seconds, before adding 2 g of silica and shearing for 30 seconds more.

The blend was sifted through 2 sieves of mesh size 250/1250 μm.

The following fractions were obtained:

| Fraction | % oil (estimated by Low Field NMR) |
|---|---|
| >1250 μm | 16% |
| >250 μm | 12% |
| <250 μm | 1% |

Example 2

Solid Scent Booster Compositions Comprising the Granulated Powder of the Invention The following compositions are prepared.

TABLE 4

Salt-based solid scent booster compositions

| Ingredients | Part |
|---|---|
| Sodium chloride | 95 |
| Spray-dried granule powder A or B or C or E | 5 |

TABLE 5

Urea-based solid scent booster compositions

| Ingredients | Part |
|---|---|
| Urea (beads) | 94 |
| Granulated powder A or B or C or E | 8 |
| Bentonite | 3 |
| Perfume | 3 |

Example 3

Performance of Granulated Powder Defined in the Present Invention in the Preparation of a Solid Scent Booster 1. Granulated Powder A-D Breakage During Processing and Surviving Stability in a Salt-Based Solid Scent Booster The tests were carried out using a basic, sodium chloride-based solid scent booster formula. The solid scent booster base with the following final composition (see table 6) was prepared.

TABLE 6

Solid scent booster composition

| Ingredients | Part |
|---|---|
| Sodium chloride | 95 |
| Spray-dried granule powder A-D | 5 |

Mix well sodium chloride and spray-dried granulated powder.

After the mixing step, breakability and stability in product upon storage were measured.

TABLE 7

Particles breakage and stability measurements for a solid scent booster comprising granulated powder A-D

| | % Fragrance loading | % Water Soluble Matrix (WSM) | % Microcapsules (M) | WS M:S Ratio | % Breakage During Product Manufacture* | % Surviving Stability ** in product (12 wks at 37° C.) |
|---|---|---|---|---|---|---|
| D | 45 | 46 | 54 | 1:1 | 100 | 0 |
| C | 30 | 64 | 36 | 2:1 | 50 | 25 |
| B | 20 | 76 | 24 | 3:1 | 20 | 100 |
| A | 10 | 88 | 12 | 7:1 | 10 | 100 |

** Surviving stability values (unencapsulated oil) were determined as follows:

A calibration point is created by mixing an amount of fragrance oil corresponding to the fragrance load in the granulated powder (0.1 g, 0.2 g, 0.3 g, 0.45 g) in a vial with 5 ml iso-octane/ether (9.1). (approximates 100% breakage/leakage)

The encapsulated oil (resulting from breakage/leakage) is isolated by dissolving 1.00 g of granulated powder in 5 ml of water and washing the aqueous phase with 5 ml iso-octane/ether (9:1). Agitate for 20 minutes in Turbula, then allow to settle (will take about another 20-30 minutes).

Extract organic phase from vial and inject into GC vials using a syringe with a 45 μm filter.

Run each sample through GC-MS

Integrate peaks and compare to calibration point to calculate percent free/unencapsulated oil in the sample. This corresponds to % breakage/leakage.

*Breakage values during product manufacture were determined as follows:

% breakage = (% unencapsulated oil/% total oil)*100.

As shown in Table 7, the breakage during the manufacturing process is significantly lower and the stability (12 weeks-37° C.) is significantly higher when the fragrance loading is low in the granulated powder.

The above results show that when the fragrance loading is greater than 30% (typically with a fragrance loading of 45%—comparative granulated powder D), breakage during the manufacturing process is extremely high and the stability is very poor.

2. Olfactive Performance of Granulated Powder B in a Salt-Based Solid Scent Booster The tests were carried out using a basic, sodium chloride-based solid scent booster formula as disclosed in table 6.

2.2 kg of cotton laundry (20 towels (30×30 cm) and 3 towels (70×50 cm) ballast) were washed in a Miele WMB 100-20 CH washing machine (40° C., short cycle without pre-wash (program Express 20 without short function), 900 rpm, followed by 2 rinsing/spinning cycles. 30 g unperfumed detergent powder were used from the detergent compartment while 22 g of the solid scent booster preparation as described in table 6 (comprising granulated powder B—20% fragrance loading) was added directly into the drum of the washing machine.

After the washing, the laundry was dried for 24 hours.

A sensory panel was performed with 14 panelists which were asked to rate the perfume intensity on dry towels before and after rubbing by using a scale between 1 (non-perceptible perfume) and 9 (very strong perfume intensity).

Samples were dosed at 4.35

Figure 2:
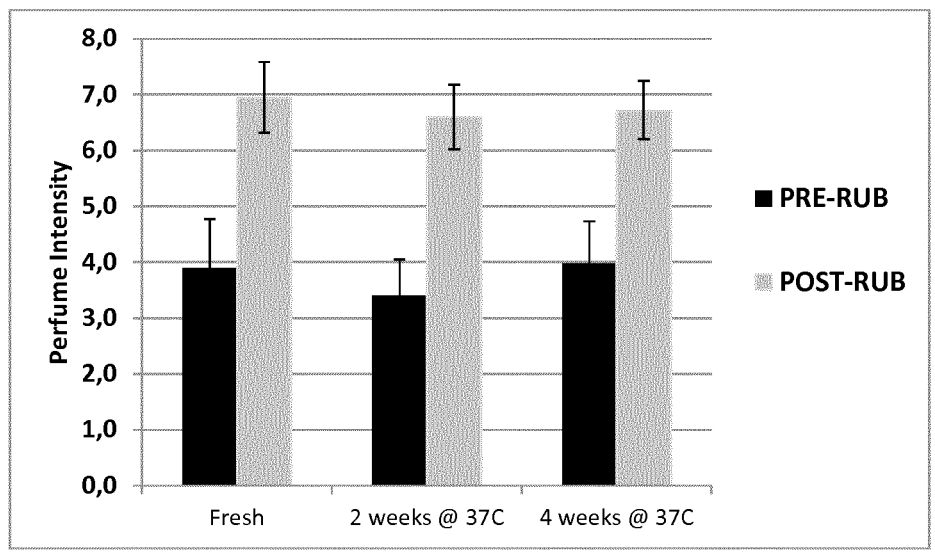

FIGS. 1 and 2 show that excellent olfactive performance on fresh after mixing into the salt scent booster composition can be obtained when said composition comprises granulated powder according to the invention having a perfume loading of 20%.

Furthermore, one can note that this performance is maintained upon storage even after 4 weeks at 37° C.

3. Olfactive Performance of Granulated Powder F in a Urea-Based Solid Scent Booster The tests were carried out using a basic, urea-based solid scent booster formula. The solid scent booster base with the following final composition (see table 8) was prepared.

TABLE 8

| Solid scent booster base composition | | | |
|---|---|---|---|
| Ingredients | Sample A (Part) | Sample B (Part) | Sample C (Part) |
| Urea (beads) | 94 | 94 | 94 |
| Granulated powder F | 0 | 8 | 6 |
| Bentonite | 3 | 3 | 3 |
| Perfume | 3 | 3 | 3 |

Add perfume to the urea beads and mix well,
Add Bentonite and granulated powder F to perfumed urea beads and mix well.

Two granulated powder fractions >1250 μm and >250 μm obtained in example 2.2 were evaluated in the solid scent booster base described above: 3.2 g of fraction >250 μm respectively 2.4 g of fraction >1250 μm were mixed with the bentonite and the perfumed-urea beads in the required proportions to obtain 40 g perfumed-solid scent booster composition. The final compositions contain 2.8% free perfume and 0.9% encapsulated perfume.

Application Protocol:
2.2 kg of cotton laundry (20 towels (30×30 cm) and 3 towels (70×50 cm) ballast) were washed in a Miele WMB 100-20 CH washing machine (40° C., short cycle without pre-wash (program Express 20 without short function), 900 rpm, followed by 2 rinsing/spinning cycles. 30 g unperfumed detergent powder were used from the detergent compartment while 22 g of the solid scent booster preparation as described above was added directly into the drum of the washing machine.

After the washing, the laundry was dried for 24 hours.

A sensory panel was performed with 14 panelists which were asked to rate the perfume intensity on dry towels before and after rubbing by using a scale between 1 (non-perceptible perfume) and 10 (very strong perfume intensity).

| Dry granulated powder-containing Scent Booster | Before rubbing | After rubbing |
|---|---|---|
| 40 g Scent Booster, cont. 3% free perfume (CONTROL-sample A) | 2.9 | 3.9 |
| 40 g Scent Booster, cont. 3% free perfume + 3.2 g dried granulated powder fraction >250 μm (sample B) | 4.9 | 8.5 |
| 40 g Scent Booster, cont. 3% free perfume + 2.4 g dried granulated powder fraction >1250 μm (sample C) | 4.8 | 8.1 |

Already before rubbing, the effect of the granulated powder according to this invention is well noticeable. However, after rubbing, the full olfactive capacity of the granulated powder is released as seen from the difference of the values before and after rubbing. In particular, the sample containing the >250 μm-fraction of granulated powder shows the highest effect.

The invention claimed is:
1. A solid scent booster composition comprising:
a solid carrier,
granulated powder comprising particles made of:
 a) a water soluble polymer matrix,
 b) an oil phase comprising a perfume dispersed in said polymer matrix, said oil phase being at least partly encapsulated in microcapsules,
wherein
said granulated powder comprises up to 30% by weight of said encapsulated oil based on the total weight of said granulated powder.
2. The solid scent booster composition according to claim 1, wherein said solid carrier comprises perfume absorbed into or adsorbed onto said solid carrier.
3. The solid scent booster composition according to claim 1, wherein said solid carrier is selected from the group consisting of urea, sodium chloride, sodium sulphate, sodium acetate, zeolite, sodium carbonate, sodium bicarbonate, clay, talc, calcium carbonate, magnesium sulfate, gypsum, calcium sulfate, magnesium oxide, zinc oxide, titanium dioxide, calcium chloride, potassium chloride, magnesium chloride, zinc chloride, saccharides, polyethylene glycol, polyvinylpyrrolidone, citric acid or any water soluble solid acid, fatty alcohols, fatty acids, and mixtures thereof.
4. The solid scent booster composition according to claim 1, wherein said composition comprises:
from 10 to 99.5% by weight of said solid carrier, and
from 0.1 to 50% by weight of said granulated powder based on the total weight of said composition.
5. The solid scent booster composition according to claim 4, wherein said composition comprises from 50 to 97% by weight of said solid carrier based on the total weight of said composition.

6. The solid scent booster composition according to claim 4, wherein said composition comprises from 3 to 30% by weight of said granulated powder based on the total weight of said composition.

7. The solid scent booster composition according to claim 6, wherein said composition comprises from 3 to 15% by weight of said granulated powder based on the total weight of said composition.

8. The solid scent booster composition according to claim 1, wherein said granulated powder comprises up to 20% by weight of said encapsulated oil based on the total weight of said granulated powder.

9. The solid scent booster composition according to claim 1, wherein the totality of said oil phase is encapsulated.

10. The solid scent booster composition according to claim 1, wherein said oil phase comprises at least one part that is not encapsulated, and wherein said granulated powder comprises up to 45% by weight of the total amount of said oil phase based on the total weight of said granulated powder.

11. The solid scent booster composition according to claim 10, wherein said oil phase comprises at least one part that is not encapsulated and wherein said granulated powder comprises up to 35% by weight of the total amount of said oil phase based on the total weight of said granulated powder.

12. The solid scent booster composition according to claim 1, wherein the part of said oil phase that is encapsulated is encapsulated in at least one microcapsule having a core-shell structure, wherein said core comprises said encapsulated oil and wherein said shell is made of a material selected from the group consisting of polyurea, polyurethane, polyamide, polyacrylate, polysiloxane, polycarbonate, polysulfonamide, urea formaldehyde, melamine formaldehyde resin, melamine formaldehyde resin cross-linked with polyisocyanate or aromatic polyols, melamine urea resin, melamine glyoxal resin, gelatin/gum arabic shell wall, and mixtures thereof.

13. The solid scent booster composition according to claim 12, wherein said shell of said at least one microcapsule is based on melamine formaldehyde resin or melamine formaldehyde resin cross-linked with at least one polyisocyanate or aromatic polyols.

14. The solid scent booster composition according to claim 1, wherein said at least one microcapsule comprises an outer coating selected from the group consisting of non-ionic polysaccharide and a cationic polymer.

15. The solid scent booster composition according to claim 1, wherein said water soluble polymer matrix is selected from the group consisting of starch, maltodextrins, polysccharides, carbohydrates, chitosan, gum Arabic, polyethylene glycol, polyvinyl pyrrolidone, polyvinyl alcohol, acrylamides, acrylates, polyacrylic acid and related, maleic anhydride copolymers, amine-functional polymers, vinyl ethers, styrenes, polystyrenesulfonates, vinyl acids, ethylene glycol-propylene glycol block copolymers, and mixtures thereof.

16. A laundry composition comprising the scent booster composition as defined in claim 1 and a laundry additive selected from the group consisting of a detergent, a softener, a rinse-aid, a water-softening, and a bleach-booster composition.

17. A method of using the solid scent booster composition according to claim 1, said method comprising using the solid scent booster composition during the laundry washing to deliver fragrance to fabrics being washed.

18. A process for preparing a solid scent booster composition as defined in claim 1, the process comprising the following steps:
mixing a solid carrier with granulated powder, wherein the solid carrier is optionally previously mixed with a free perfume, and
drying said mixture.

* * * * *